United States Patent
Blaustein et al.

(10) Patent No.: US 6,301,919 B1
(45) Date of Patent: Oct. 16, 2001

(54) ICE CREAM BAR-MAKING MACHINE

(75) Inventors: Lawrence A. Blaustein, Cleveland; Douglas A. Gall, Wilmington; Patrick W Brown, Cleveland, all of OH (US)

(73) Assignee: Wham-O, Inc., San Francisco, CA (US)

( * ) Notice: Subject to any disclaimer, the term of this patent is extended or adjusted under 35 U.S.C. 154(b) by 0 days.

(21) Appl. No.: 09/649,388

(22) Filed: Aug. 28, 2000

(51) Int. Cl.$^7$ ................................................. A23G 9/10
(52) U.S. Cl. .......................... 62/345; 62/457.1; 249/120; 249/137; 249/139
(58) Field of Search .................. 62/345, 457.1, 62/457.2; 249/120, 137, 139

(56) References Cited

U.S. PATENT DOCUMENTS

| | | |
|---|---|---|
| 205,643 * | 7/1878 | Holden ................................... 62/345 |
| 390,349 | 10/1888 | Delpy . |
| 449,665 | 11/1891 | Camp . |
| 517,492 | 4/1894 | Skipper . |
| 523,781 | 7/1894 | Wallace . |
| 786,129 | 3/1905 | Lichtentag . |
| 1,392,385 | 10/1921 | Wishart . |
| 1,915,220 | 6/1933 | Fegley et al. . |
| 2,282,544 | 5/1942 | Rosberg . |
| 3,261,178 | 7/1966 | Okada ..................................... 62/345 |
| 3,733,846 | 5/1973 | Gram ..................................... 62/345 |
| 3,780,536 * | 12/1973 | Fishman et al. ..................... 62/457.1 |
| 4,078,397 * | 3/1978 | Brande ................................. 62/457.1 |
| 4,179,904 | 12/1979 | McClenny .............................. 62/342 |
| 4,534,536 * | 8/1985 | Nelson et al. ........................ 249/120 |
| 4,579,313 * | 4/1986 | Adani et al. .......................... 249/120 |
| 5,012,655 * | 5/1991 | Chatterton ............................ 249/120 |
| 5,568,729 | 10/1996 | Heinrich et al. .......................... 62/75 |

* cited by examiner

*Primary Examiner*—William E. Tapolcai
(74) *Attorney, Agent, or Firm*—John M. McCormack; Owen W. Dukelow; Kolisch Hartwell et al

(57) ABSTRACT

A machine for making ice cream bars is provided with a receptacle for holding a refrigerant, preferably an ice and brine bath, a lower lid movably mountable over the receptacle, and an upper lid mountable over the lower lid, the lower and upper lids rotatable together about a vertical axis. The machine further includes four containers for receiving and holding an ice cream bar mix, the containers configured to be coupled to the upper lid and the lower lid with a portion of the container immerged in the bath. A user can turn a handle on the receptacle to rotate the lids, and thus the containers relative to the bath in order to promote freezing of the ice cream mix into an ice cream bar.

20 Claims, 4 Drawing Sheets

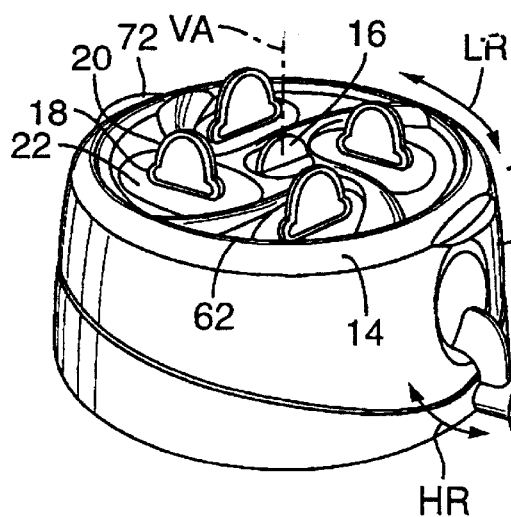
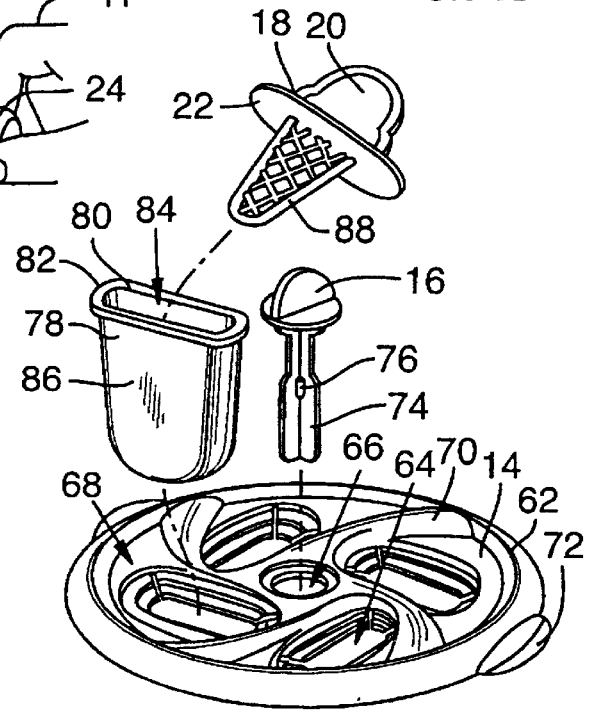
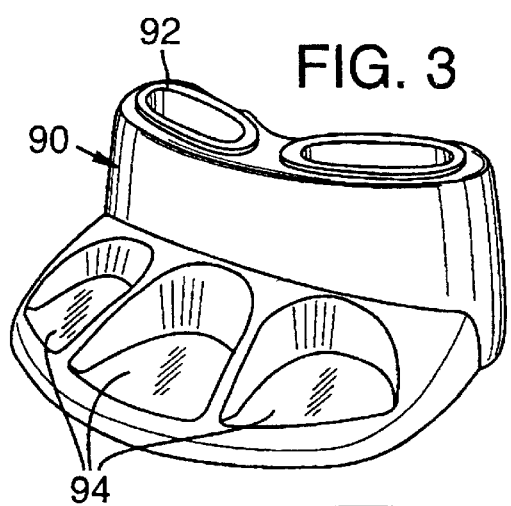
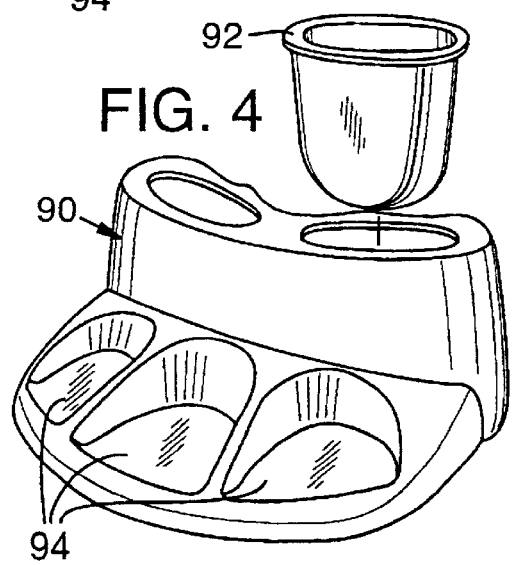
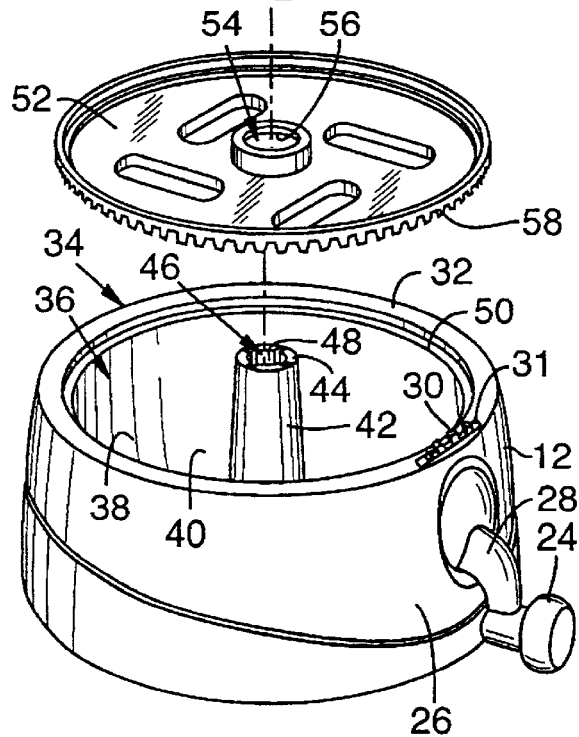

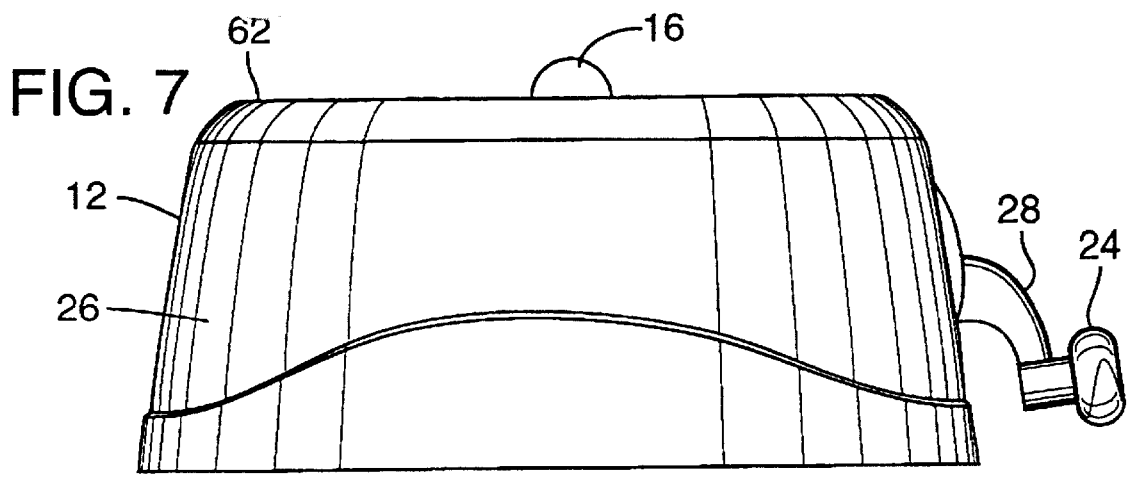
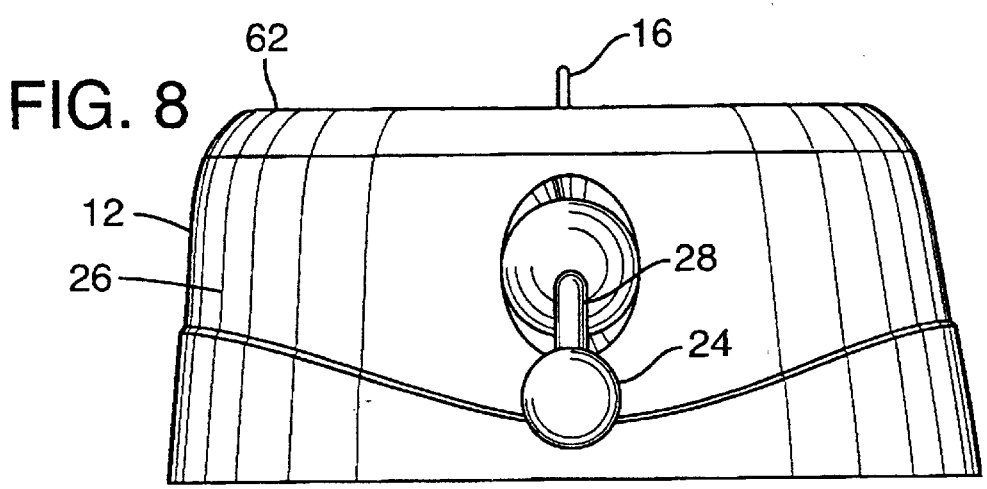
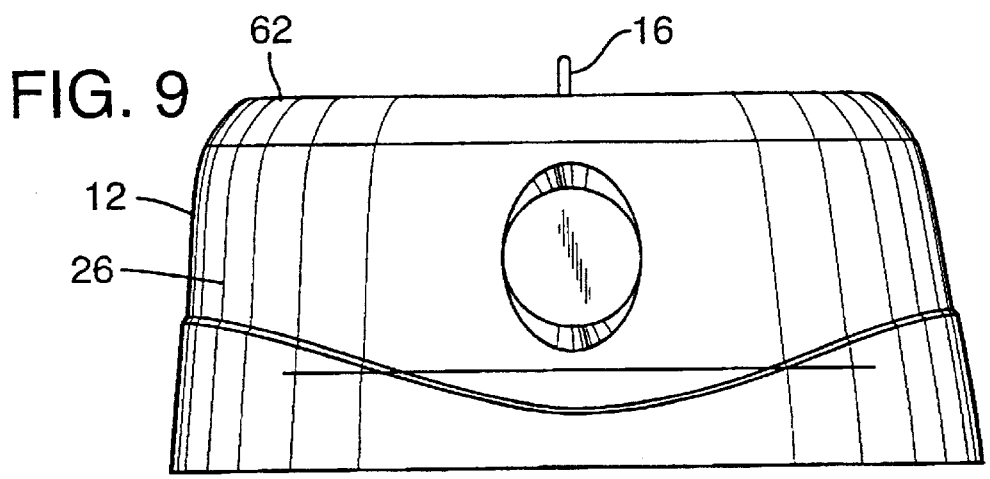

ICE CREAM BAR-MAKING MACHINE

BACKGROUND

This invention relates generally to an apparatus for affecting the temperature of a substance by placing the substance in a container and immersing the container in a bath. More particularly, the invention concerns an ice cream bar maker, including a receptacle for holding an ice and brine bath, an upper lid and a lower lid for holding the container partially immersed in the bath, and a drive mechanism for rotating the lids to move the container in the bath, thus to promote sinking of heat away from the substance, particularly an ice cream mix which freezes in the container to form an ice cream bar.

Children enjoy preparing and eating ice cream and other frozen treats. Ice cream is made by freezing a cream-based mixture or other appropriate mixture in a tub while turning a paddle in the mixture to combine air with the mixture as it freezes. The churning of the mixture by the paddle also helps to distribute the effect of a surrounding refrigerant throughout the mixture to speed the freezing. Such manual preparation of ice cream can be an enjoyable, albeit laborious prelude to the serving and eating of the ice cream. Ice cream can also be formed simply by combining an appropriate dry mixture with cream or half-and-half, i.e., cream mixed with whole milk and freezing the combination, which method is well suited for preparing ice cream in bars or other shapes.

SUMMARY OF THE INVENTION

The apparatus of the present invention provides for making ice cream bars on reusable sticks by a method that mimics the manual preparation of ice cream, although without tuning a paddle in a cream mixture. The invented apparatus includes a receptacle or bowl for holding an ice and brine bath four containers for holding an ice cream-forming mixture. A lower lid is disposed over the receptacle and has a toothed rim that mates with a drive gear mounted to the receptacle. A handle coupled to the gear extends from the receptacle so that a user can grasp and turn the handle to rotate the lower lid about a vertical axis. An upper lid disposed over the lower lid includes four slots that correspond to four slots in the lower lid. Each container is inserted through a pair of upper and lower lid slots so that a portion of the container depends into the receptacle and is immersed in the ice and brine bath.

The receptacle includes a rim defining an upward-facing opening and the upper lid holds the containers so that the container's edge is higher than the rim of the receptacle, thus preventing the bath from leaking or seeping into the container. That is, even if the receptacle is overfilled, the bath flows over the rim of the receptacle before it reaches the edge of the container. Children may use the apparatus, with or without parental supervision depending on the children's maturity, to make their own ice cream bars by following simple instructions.

The receptacle includes a central mount surrounded by an annular basin and the mount has an annular bearing surface. The lower lid has a corresponding annular bearing surface that mounts rotatably to the receptacle's bearing surface. The upper lid mounts over the lower lid, and with the containers in place through the slots of both lids, the upper and lower lids rotate together as the handle is turned, thus moving the containers through the bath. Rotating the containers is not strictly necessary for freezing the mixture, but it speeds sinking away of heat from the containers and thus speeds freezing. Additionally, cranking the handle is reminiscent of cranking a handle on a manual ice cream maker and can be a pleasant pastime while one waits for the mixture to freeze.

BRIEF DESCRIPTION OF THE DRAWINGS

FIG. 1 is an isometric view of the ice cream bar maker of the present invention, showing a receptacle with an upper lid in place, four grips of reusable sticks extending above the upper lid, a bolt holding the upper lid in place, and a hand of a user grasping and rotating a handle of a drive mechanism to rotate the upper lid.

FIG. 2 is an exploded isometric view of the ice cream bar maker showing the handle and web of the reusable stick above a container for the ice cream mixture above the upper lid, which is above a lower lid, which is above the receptacle, and also showing a central mount having an annular bearing surface in the receptacle.

FIG. 3 is an isometric view of a rack used in association with the ice cream bar maker, the rack including three bins for holding ice cream bar decorations, such as sprinkles, chopped nuts, or cookie pieces, and two removable cups for holding coatings for the ice cream bars.

FIG. 4 is a partially exploded isometric view of the stand of FIG. 3, with one of the cups shown above the stand.

FIG. 7 is a front plan view of the ice cream bar maker with the upper lid and bolt in place.

FIG. 8 is a side plan view of the handle-side of the ice cream bar maker.

FIG. 9 is a side plan view of the side of the ice cream bar maker opposite the handle-side.

DETAILED DESCRIPTION OF THE PREFERRED EMBODIMENTS

Figure 5:
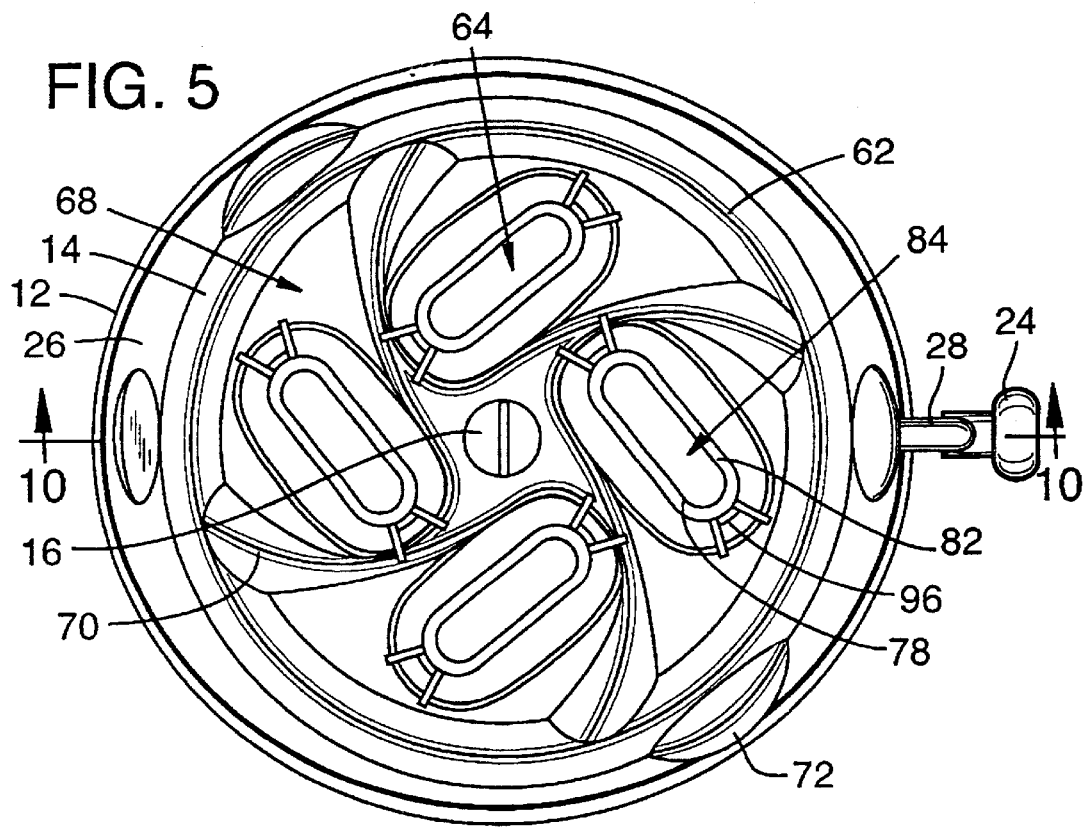
FIG. 5 is an overhead view of the ice cream bar maker showing the upper lid, with the sticks removed, and four ice-cream-bar-mixture containers inserted in four slots in the upper lid, the containers snapped into place in retainers adjacent the slots which consist of flexible tabs at each end of the slots, and also showing a pair of brine-escape ports on the upper lid, as well as the handle of the drive mechanism.

As shown in FIG. 1, an ice cream bar maker, indicated generally at 10, according to the present invention includes a receptacle 12 within which ice cream bars, preferably four at a time, can be made by freezing an ice cream mix. An upper lid 14 fits over receptacle 12 and is held down by a bolt 16. The ice cream bars are frozen onto four reusable sticks 18, of which only vertical grips 20 and horizontal plates 22 are visible in FIG. 1. A user promotes freezing of the ice cream bars by grasping by a hand H a handle 24, and rotating the handle in either direction, as shown by arrows HR, to cause rotation of upper lid 14 about a vertical axis VA, as shown by arrows LR. Receptacle 12 is typically about 8¾-inches wide and three inches high, and thus is easily portable and generally usable on a kitchen countertop.

Figure 10:
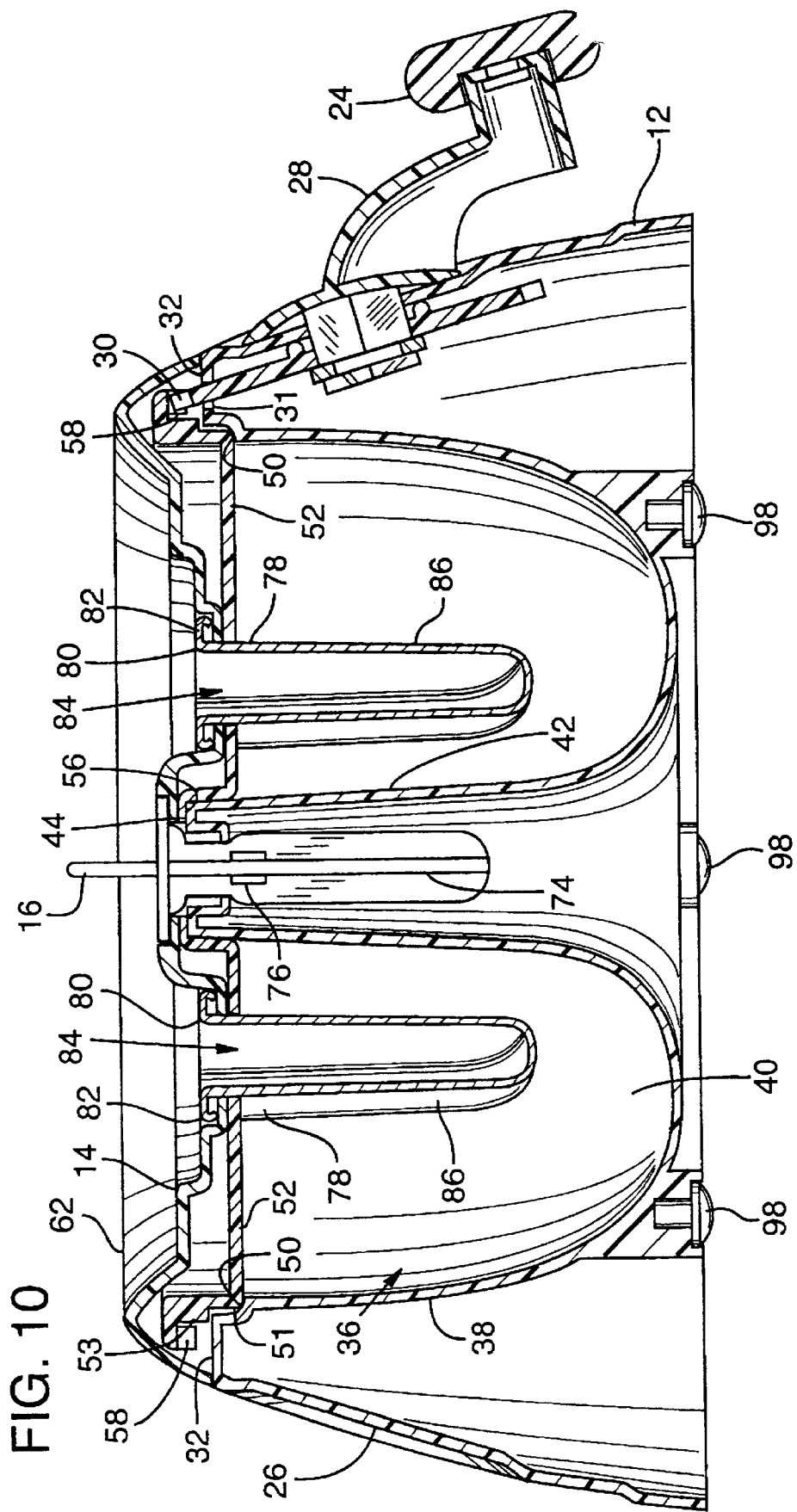
FIG. 10 is a cross-sectional view of the ice cream bar maker, as cut in FIG. 5, showing the lower lid bearing on the central mount, a gear of the drive mechanism engaging a toothed rim of the lower lid, and the containers fitting through the slots of the upper and lower lids and being immersed in an ice and brine bath in the basin of the receptacle.

As shown in FIGS. 2 and 10, receptacle 12 includes an outer wall 26, on one side of which a crank 28 of handle 24 is rotatably mounted for rotation about a roughly horizontal axis. Handle 24 is coupled to a drive mechanism, such as gear 30. Receptacle 12 includes a circular rim 32 that defines an upward-facing opening 34 to an annular basin 36 defined by inner wall 38 and a central mount 42. Gear 30 is positioned to extend partly through an aperture 31 through rim 32 of receptacle 12.

Figure 6:
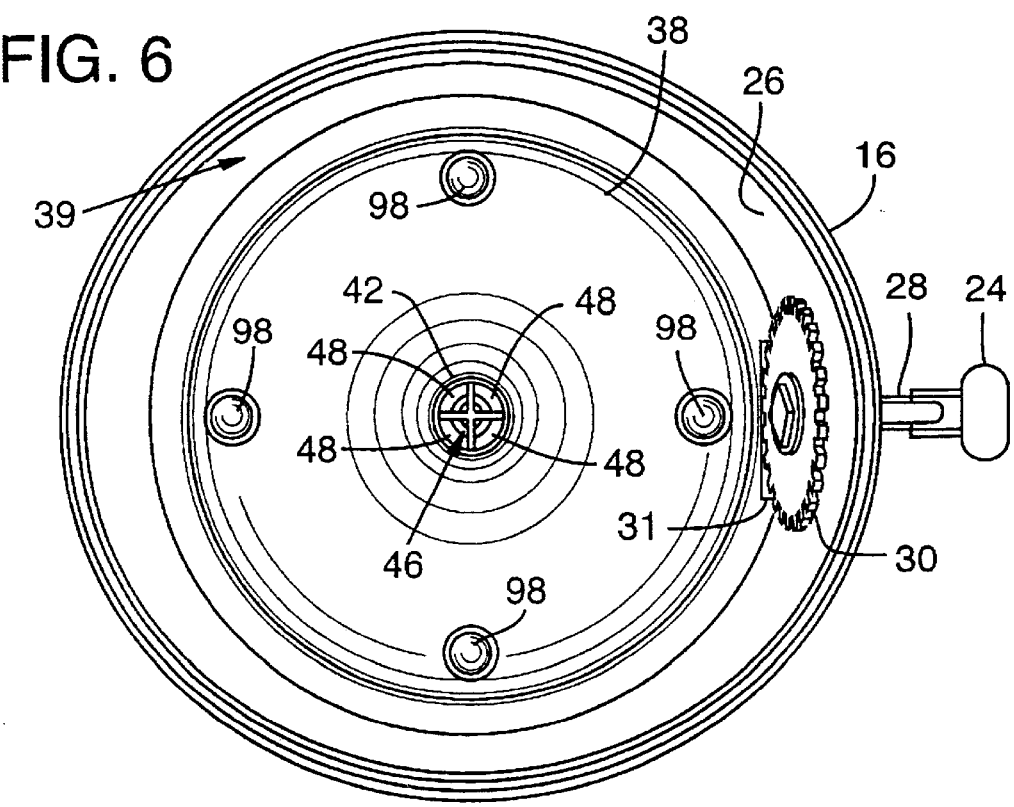
FIG. 6 is a bottom view of the ice cream bar maker showing four pads on which the receptacle stands, the underside of the central mount of the receptacle, and the handle and gear of the drive mechanism.

The user inserts an ice and brine bath 40 into basin 36 through opening 34. Preferably the user first distributes about ½-cup of salt in the basin, adds a cup of water, and then stirs to dissolve the salt into brine. Then, the user preferably adds cube or crushed-cube ice to within about ¾-inches of rim 32, stirs again, distributes a cup of salt over the ice, pours about ½-cup of water on that and stirs again to create bath 40. As best seen in FIG. 6, a space 39 between inner wall 38 and outer wall 26 helps to insulate basin 36 from ambient heating of bath 40.

Central mount 42 is preferably roughly cylindrical and rises from the bottom of basin 36. Mount 42 includes at its uppermost end an annular bearing surface 44 surrounding a central, cross-shaped aperture 46 formed by four flexible latches 48 (see also FIG. 6). A ridge 50 is formed on inner wall 38 of receptacle 12 below rim 32. Receptacle 12 is preferably molded in a single piece of ABS plastic.

A circular, lower lid 52, preferably molded in a single piece of ABS plastic, fits over receptacle opening 34. Lower lid 52 includes a central aperture 54 surrounded by an annular bearing surface 56 that rotates on surface 44 of receptacle 12 so that lower lid 52 can be rotatably mounted over opening 34. Lower lid 52 also conforms with, and may bear on, ridge 50 and rim 32 at edge 51 and edge 53, respectively. Lower lid 52 has an outer, toothed edge 58 that engages gear 30. Thus, rotating handle 24 causes rotation of gear 30, which in turn rotates lower lid 52 about vertical axis VA. Lower lid 52 also includes four round-ended slots 60 defined therethrough, slots 60 providing limited access to bath 40 when lower lid 52 is in place on mount 42. The knob of handle 24 is preferably made of acetal plastic. Crank 28 and gear 30 are preferably made of ABS plastic.

A suitable dry powder for forming an ice cream mix is made of sugar, dried corn syrup solids, nonfat dry milk, calcium silicate, which prevents caking, guar gum, carrageenan, gum arabic, and flavoring. The user mixes the powder, preferably with half-and-half, or with cream, or other suitable liquid to make the ice cream mix that is ready to be frozen into ice cream bars.

Referring to FIGS. 2 and 10, upper lid 14, which is preferably molded in a single piece of ABS plastic, includes a raised edge 62 to contain the liquid ice cream mixture if spilled. Four round-ended slots 64, corresponding to the slots of lower lid 52, are defined through upper lid 14, which also includes a central aperture 66. Upper lid slots 64 are each formed in separate wells 68 defined by four curved berms 70 and raised edge 62, wells 68 preventing a spill of the liquid ice cream mixture for one of the bars from flowing over to the other slots. Raised edge 62 of upper lid 14 includes two ports 72 that allow brine to escape out of basin 36 over rim 32 if receptacle 12 is too full.

Upper lid 14 and lower lid 52 are releasably held in place by bolt 16, which extends through apertures 66 and 54 in the lids and into cross-shaped aperture 46 in receptacle mount 42. Bolt 16, which is preferably formed of acetal plastic, includes a cross-shaped body 74 that fits into aperture 46. Body 74 includes four catches 76 (one shown) that are releasably held by flexible latches 48 of receptacle mount 42 so that lids 14 and 52 are held in place for rotation above bath 40 but are removable by the user by lifting out bolt 16.

The liquid ice cream mixture is initially poured into four containers 78 (one shown in FIG. 2, two shown in FIG. 10) that are preferably formed of a heat-transmissive metal, such as aluminum. Containers 78 include an edge 80 with a lip 82 and a cavity 84 for receiving and holding the mixture. Each container fits into and through upper lid slot 64 and corresponding lower lid slot 60, and a lower portion 86 of container 78 depends into bath 40. Lip 82 has a width and a length dimension greater than that of upper lid slot 64 to prevent container 78 from passing through slot 64. Sticks 18 each include a web 88 about which the ice cream mixture freezes, so that web 88 provides a support structure for the frozen ice cream bar when it is removed from container 78. Sticks 18 are preferably formed of a food-grade LDPE plastic.

As shown in FIG. 3 and 4, the invention includes a rack 90 for syrups and other toppings. The frozen ice cream bars can be decorated by dipping them in a syrup, preferably one that forms a hard-shell coating when cooled by the ice cream bars, the syrup being disposed in a removable, preferably LDPE cup 92 in rack 90. The other toppings, such as sprinkles, can be placed in bins 94 and added to the frozen ice cream bars, e.g., by pressing the bars onto the sprinkles in bins 94.

As shown in FIG. 5, each slot 64 in upper lid 14 includes at its rounded ends two flexible tabs 96 for releasably capturing lip 82 of container 78. After the user has inserted ice and brine bath 40 in basin 36, the user preferably places lower lid 52 in place over receptacle opening 34. Then the user preferably inserts containers 78 in upper lid slots 64 and snaps container lip 82 in place in tabs 96. Then the user preferably places upper lid 14 with containers 78 over lower lid 14. As the user moves upper lid 14 into place, containers 78 immerse in bath 40 and displace some of bath 40, which thus pushes upwardly on containers 78. However, tabs 96 act as retainers to prevent upward movement of containers 78 relative to upper lid 14. The user preferably pours the ice cream mix into containers 78 after installing lid 14 with containers 78 on receptacle 12 and securing the lids with bolt 16. As shown in FIG. 6, receptacle 12 includes four pads 98, which can be formed of neoprene, and upon which receptacle 12 rests on a countertop.

As best seen in FIG. 10, with containers 78 installed in upper lid 14, and upper lid 14 installed over lower lid 52, edges 80 of containers 78 are higher than rim 32 of receptacle 12. Thus, if the user fills receptacle 12 with bath 40 up to rim 32, and then installs the lids and the containers, portions 86 of containers 78, as well as lower lid 52, are immersed in bath 40, and displace a portion of the bath. However, the excess of bath 40 will tend to flow over rim 32 through escape ports 72 in upper lid 14 rather than over edges 80 and into containers 78 since edges 80 are higher.

Freezing of the ice cream mix typically takes about ten minutes, The user preferably checks the freezing after about nine minutes by gently attempting to lift each of sticks 18. If sticks 18 do not move in response to gentle upward pressure, the ice cream mix is considered to have frozen into an ice cream bar. Then the user preferably removes bolt 16 and upper lid 14 with containers 78, holds containers 78 under cold running water to rinse off the brine and to separate the ice cream bars from containers 78 by heating containers 78, and then removes the ice cream bars by pulling sticks 18 away from containers 78. Then the user may add additional toppings to the ice cream bar and eat or store it in a freezer for later eating.

As described above, ice cream bar maker 10 preferably includes two lids—upper lid 14 and lower lid 52. Having two separate lids helps to minimize spillage problems. For example, bath 40 is still covered by lower lid 52 when upper lid 14 with containers 78 is removed from receptacle 12 for removal of the ice cream bars. The two separate lids also help to keep the ice and brine bath 40 separate from the ice cream mix in containers 78 because, not only are container edges 80 higher than receptacle rim 32, but also bath 40 must seep past a joint between containers 78 and lower lid 52 and then a joint between containers 78 and upper lid 14 before it can enter containers 78. Preferably, flexible tabs 96 around upper lid slots 64 are formed by gaps in upper lid 14 that could allow seepage of brine into containers 78, but lower lid 52 contains bath 40 and channels it toward rim 32 of receptacle 12. However, a single lid could be used and the features of a toothed rim, bearing surface, slots and retainers for the containers (or built-in containers), a raised edge and separate wells to contain spills of ice cream mix, and a container edge higher than receptacle rim 32 can alternatively be incorporated on a single lid. Alternatively, maker 10 can include both lids, but retainer 96 for containers 78 can be incorporated in lower lid 52, toothed rim 58 can be incorporated on upper lid 14, and bearing surface 56 and edges 51 and 53 could be incorporated on upper lid 14.

While the invention has been disclosed in its preferred form, the specific embodiments thereof as disclosed and illustrated herein are not to be considered in a limiting sense, as numerous variations are possible. Applicant regards the subject matter of the invention to include all novel and non-obvious combinations and subcombinations of the various elements, features, functions and/or properties disclosed herein. No single feature, function, element or property is essential to all of the disclosed invention. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed invention and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. An apparatus for affecting the temperature of a substance by immersion in a bath, the apparatus comprising:
    a receptacle configured to hold the bath, the receptacle having an upward-facing opening;
    a lower lid movably mountable over the upwardly-facing opening of the receptacle;
    an upper lid configured to be movably mounted over the lower lid;
    a container having a cavity for receiving and holding the substance, the container configured to be coupled to the upper lid and the lower lid so that, when the bath is in the receptacle and the upper and lower lids are mounted over the receptacle, at least a portion of the container is immersed in the bath,
    wherein the container can be moved by a user relative to the bath.

2. The apparatus of claim 1 further comprising a drive mechanism and a handle coupled to the drive mechanism, the handle operable by the user to move the container relative to the bath.

3. The apparatus of claim 2 wherein the lower lid and the upper lid are rotatably mounted to the receptacle.

4. The apparatus of claim 3 wherein the drive mechanism includes a gear coupled to one of the lower and the upper lids.

5. The apparatus of claim 4 wherein the one of the upper and lower lids to which the gear is coupled includes a toothed rim configured to mesh with the gear.

6. The apparatus of claim 1 wherein the receptacle includes a mount centered on a vertical axis of the receptacle, and the mount includes an annular bearing surface, and wherein one of the lower and upper lids includes an annular bearing surface configured to rotate on the bearing surface of the receptacle mount.

7. The apparatus of claim 6 wherein the mount includes a central aperture, and the apparatus further comprises a bolt affixable in the central aperture of the mount for releasably retaining the upper and lower lids on the receptacle.

8. The apparatus of claim 1 wherein the upper lid includes a slot defined therethrough, the lower lid includes a corresponding slot defined therethrough, and the container fits into and is releasably held in the slots.

9. The apparatus of claim 8 wherein the container includes a lip having a greater lateral dimension than at least one of the upper lid slot and the lower lid slot.

10. The apparatus of claim 9 wherein one of the upper lid slot and the lower lid slot includes a retainer for releasably affixing the container in the slot and impeding upward motion of the container relative to the slot.

11. The apparatus of claim 10 wherein the retainer is a flexible tab configured to capture the lip of the container.

12. An apparatus for affecting the temperature of a substance by immersion in a bath, the apparatus comprising:
    a receptacle configured to hold the bath, the receptacle having an upward-facing opening;
    an upper lid configured to be movably mounted over the upward-facing opening of the receptacle;
    a container including a cavity for receiving and holding the substance, the container couplable to the upper lid with at least a portion of the container immersed in the bath; and
    a drive mechanism and a handle coupled to the drive mechanism, the handle configured to be held by a user and hand-operated to move the container relative to the receptacle.

13. The apparatus of claim 12 further comprising a lower lid movably mountable over the upwardly-facing opening of the receptacle beneath the upper lid, the lower lid couplable to the upper lid and to the drive mechanism.

14. The apparatus of claim 13 wherein the drive mechanism moves the container by directly engaging and moving the lower lid.

15. An apparatus for freezing an ice cream mixture into an ice cream bar, the apparatus comprising:
    a receptacle configured to hold an ice and brine bath, the receptacle having a circular, upward-facing opening and a rim;
    a lower lid rotatably mounted over the upwardly-facing opening of the receptacle, the lower lid including a plurality of slots defined therethrough;

an upper lid having a plurality of slots defined therethrough, the slots of the upper lid corresponding to the slots of the lower lid, the upper lid configured to be mounted over the lower lid;

a plurality of heat-transmissive containers, each container including an upper edge and a cavity for receiving and holding the ice cream mixture, each container configured to be inserted through one of the slots in the upper lid and through the corresponding slot of the lower lid with at least a portion of the container immersed in the ice and brine bath and with each container edge disposed above the rim of the receptacle.

16. The apparatus of claim 15 wherein the containers can be moved by a user relative to the bath.

17. The apparatus of claim 16 wherein the upper and lower lids are rotatably mounted over the receptacle and the user can move the containers by rotating the lids.

18. The apparatus of claim 17 wherein the receptacle includes a mount with a flexible latch, and further including a bolt for releasably affixing the upper and lower lids to the receptacle, the bolt having a catch, the flexible latch configured to releasably hold the catch.

19. The apparatus of claim 15 wherein the receptacle and lids are formed substantially of a plastic and the containers are formed substantially of a metal.

20. An apparatus for freezing an ice cream mixture into an ice cream bar, the apparatus comprising:

a receptacle configured to hold an ice and brine bath, the receptacle having a circular, upward-facing opening and a rim, and the receptacle including a central mount having an annular bearing surface;

a circular lower lid defining an outer rim and having a central, annular bearing surface, the lower lid further including a plurality of slots defined through the lid, the lower lid configured to be rotatably mounted over the upwardly-facing opening of the, receptacle with the bearing surface of the lower lid rotatable on the bearing surface of the receptacle mount;

an upper lid having a plurality of slots defined therethrough, the slots of the upper lid corresponding to the slots of the lower lid, the slots of the upper lid each including a retainer, the upper lid configured to be mounted over the lower lid, a plurality of heat-transmissive containers, each container including an edge and a cavity for receiving and holding the ice cream mixture, each container configured to be inserted through one of the slots in the upper lid and the corresponding slot of the lower lid with the container releasably held by the retainer and at least a portion of the container immersed in the ice and brine bath and the edge disposed above the rim of the receptacle; and a hand-operated drive mechanism mounted in the receptacle, the mechanism configured to couple to the outer rim of the lower lid for rotating the lower lid, the upper lid, and the containers about the central mount of the receptacle.

* * * * *